United States Patent [19]

Deeg et al.

[11] 3,874,777

[45] Apr. 1, 1975

[54] MULTIFOCAL LENS BLANKS

[75] Inventors: Emil W. Deeg, Woodstock, Conn.; Bradford Canterbury; Arnold J. Simpson, both of Southbridge, Mass.

[73] Assignee: American Optical Corporation, Southbridge, Mass.

[22] Filed: Apr. 26, 1973

[21] Appl. No.: 354,599

[52] U.S. Cl. ............... 351/168, 65/37, 65/38, 65/39
[51] Int. Cl. .................. G02c 7/06, C03b 11/08
[58] Field of Search ............ 65/37, 38, 39; 351/168

[56] References Cited
UNITED STATES PATENTS
1,026,182   5/1912   Seymour ................................ 65/39
3,149,948   9/1964   Seymour ................................ 65/39
3,178,274   4/1965   Duncan et al. ........................ 65/39

*Primary Examiner*—S. Leon Bashore
*Assistant Examiner*—Frank W. Miga
*Attorney, Agent, or Firm*—H. R. Berkenstock, Jr.; William C. Nealon

[57] ABSTRACT

Casting a glass major portion of a multifocal lens blank over a glass segment portion of the blank or impressing the segment into the major portion during or immediately after casting. The glass for the major is selected to coincide in viscosity with the segment glass within a range of $10^5$ to $10^9$ poises at least at one temperature, and that above the crossover point the viscosity of the segment glass is higher than the viscosity of the major glass at the same temperature.

4 Claims, 9 Drawing Figures

3,874,777

3,874,777

MULTIFOCAL LENS BLANKS

BACKGROUND OF THE INVENTION

1. Field of the Invention

Multifocal lens making with particular reference to cast multifocal lens blanks.

2. Description of the Prior Art

Heretofore, most fused multifocal lens blanks have been formed of at least two optically ground and polished pieces of glass, one having an optically finished countersink and the other a similarly finished surface of complimentary curvature. These pieces were assembled and fused in a furnace.

In attempts to overcome at least some of the costliness in time, labor and inventory involved in grinding, polishing and storing two or more glass pieces for each multifocal blank, the prior art has cast lens blank segment portions directly into preformed countersinks of major portions. This, however, has the limitation of the segment in each case having to consist entirely of a single refractive index glass and be completely circular. U.S. Pat. No. 2,992,518 is exemplary of this technique.

Other prior art practices have involved the casting and pressing together of major and minor pieces of glass, one being rigid and the other caused to flow thereover. This technique, in general, is exemplified in U.S. Pat. Nos. 2,026,606; 2,433,013; and 3,149,948. It has, however, been largely abandoned in favor of the first mentioned two-piece grinding, polishing and mechanical assembly operations in view of occurrences of distortion of interfaces between major and segment portions, bubbles, striae, fusing waves and cracking defects tending to render the end products less acceptable.

The present invention overcomes the aforementioned difficulties and related problems in casting fused multifocal lens blanks.

SUMMARY OF THE INVENTION

This invention contemplates either the casting of a major piece of heat-softened glass of relatively low refractive index over a rigid segment portion of higher refractive index or the impressing of the segment into a molten major portion of relatively low refractive index. In either case, prior art interfacial distortion between major and segment portions is overcome through the use of a segment glass of a viscosity higher than the viscosity of the glass for the major portion at least below the temperature at which the fusion takes place. The glass for the major is selected to have a viscosity/temperature curve which crosses the viscosity/temperature curve of the segment glass within a range of $10^5$ to $10^9$ poises in such a manner that above the crossover point the viscosity of the segment glass is higher than the viscosity of the major glass at the same temperature. The glasses are furthermore selected for compatibility with respect to mechanical properties and linear thermal expansion so as to maintain a permanent seal with low fusion strain at and about room temperature. Cleanliness is observed to reduce interfacial defects resulting from dust accumulation and the like, the surfaces of the rigid segment are preheated to oxidize substantial amounts of unavoidable particulate foreign matter and adsorbed or absorbed water and the two glasses are selected for compatibility in assimilating gases at the interface layer during and after fusion. Minimum fusion temperature is used to minimize the release of gases from surface portions of the higher viscosity segment glass.

The invention will be more fully understood by reference to the following detailed description taken in conjunction with the accompanying drawings.

DESCRIPTION OF THE PREFERRED EMBODIMENTS

Figure 1:
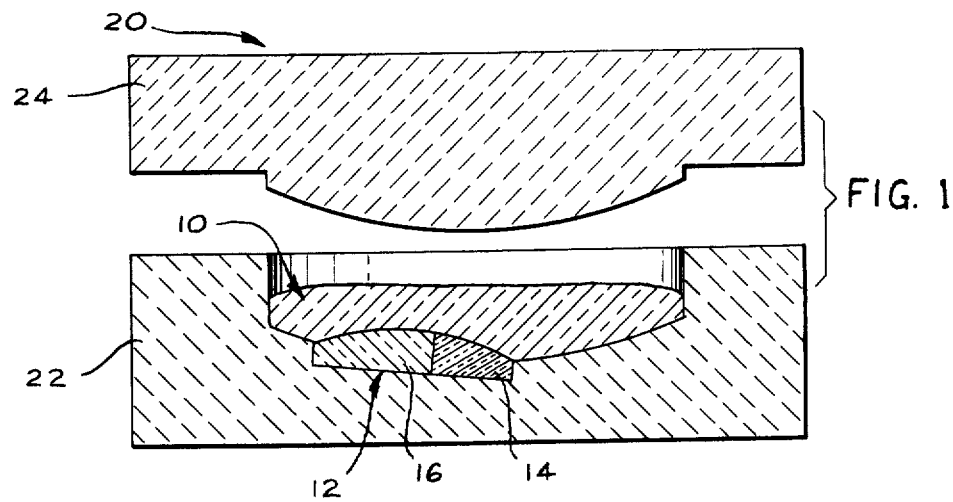
FIGS. 1 and 2 are diagrammatic illustrations, in cross-section, of steps involved in the casting of a multifocal lens according to one aspect of the invention.
Figure 3:
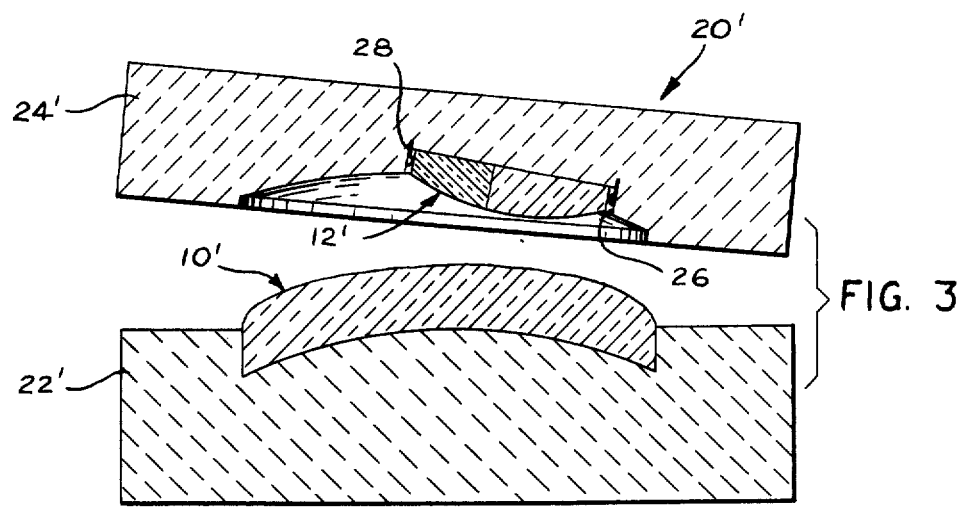
FIGS. 3 and 4 are similar diagrammatic illustrations, in cross-section, of the casting of a multifocal lens according to another aspect of the invention.
Figure 5:
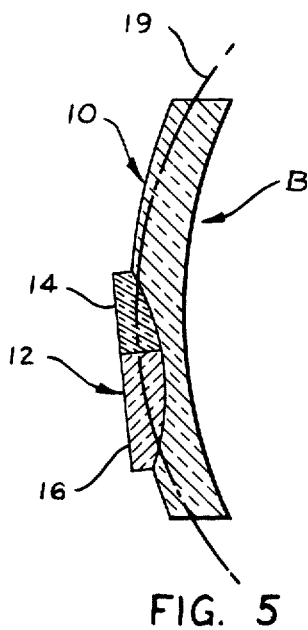
FIG. 5 is a vertical cross-sectional view of a multifocal lens blank resulting from the practice of the present invention.
Figure 6:
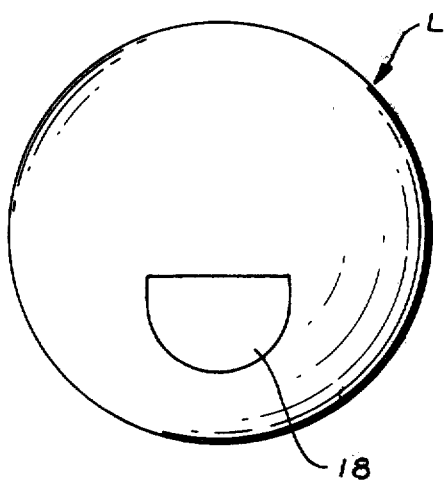
FIG. 6 is a front elevational view of the lens blank shown in FIG. 5 following grinding and polishing of its convex front surface.

According to the present invention, the major portion 10 of a multifocal lens blank is cast to the final shape and size desired thereof either on top or beneath the segment portion of the blank as shown in FIGS. 1 and 3. In either case, joining of the cast major portion and segment portion by fusion forms a fused multifocal lens blank of the type shown in FIG. 5. The segment portion 12 may comprise two or more pieces 14 and 16 of glass as shown in the drawings or, alternatively, a single piece of glass not shown. In the illustrated embodiments of the invention, segment portion 12 is made up of two pieces 14 and 16 of glass wherein piece 14 is approximately the same index of refraction as the glass of major portion 10. Piece 16, being of a different, preferably high, refractive index becomes reading portion 18 (FIG. 6) producing higher magnification in a finished lens L formed from blank B. The use of combinations of high and low refractive index glasses with rear curvatures of reading portions in fused multifocal lens blanks for making fields of differing power is well understood in the art. Those interested in details of this aspect of multifocal lens making may refer to U.S. Pat. Nos. 2,026,606, 2,433,013; and 3,149,948. Also, explained in the aforementioned reference patents is the customary grinding and polishing of the convex side of a lens blank to the front curvature desired of a finished lens blank. This is illustrated in FIG. 5 with line 19 which represents one meridian of a spherical curvature to which the front side of lens blank B may be typically ground and polished.

Figure 2:
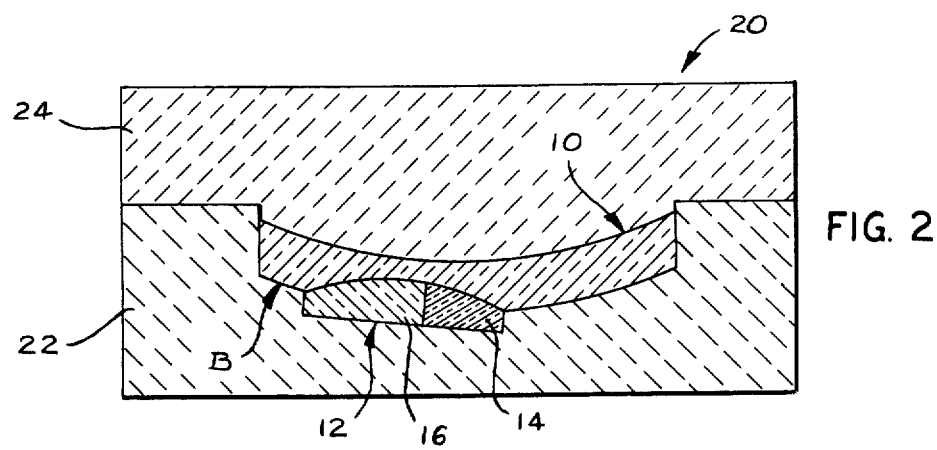

FIGS. 1 and 2 illustrate the casting of major portion 10 over segment portion 12 in mold 20. Mold 20 has lower half 22 which supports the segment 12 and a separate upper half 24. These two mold halves are brought together as shown in FIG. 2 for completing the casting operation.

According to principles of this invention, segment portion 12 is maintained in a rigid state at all times during the casting operation so that interfacial distortion between this segment portion, and major portion 10 is avoided. This is accomplished through the use of a high softening temperature glass with steep viscosity—temperature curve for at least the piece 16 of segment 12 and relatively low softening temperature glass with a less steep viscosity—temperature curve for major portion 10. Major portion 10 is caused to flow over and around segment portion 12 and conform precisely to its adjoining surface shape during casting by the closing of mold halves 22 and 24. The difference in the shape of the viscosity - temperature curves of the glasses used for major and segment, respectively, results in a crossover of the viscosity curves of both glasses. The glass for the major portion has a viscosity of approximately $10^2$ to $10^5$ poises at the casting temperature. The segment is preheated to a temperature several hundred degrees centigrade below the casting temperature of the major glass resulting in a viscosity of the segment of approximately $10^{13}$ to $10^{14}$ poises. After bringing the major and the segment glasses in thermal contact with each other, the temperature of the surface of the segment increases to a temperature at which a permanent fusion with the major glass can be formed. This takes place in a temperature range with lower limit corresponding to a viscosity of approximately $10^9$ poises and the temperature of the crossover point as upper limit for example, the temperature range for fusion of the combination of high and low refractive index glasses (d) and (a) respectively of FIG. 7, having a temperature crossover point $T_o$, extends approximately between the arrowheads of line F. For the combination of high and low refractive index glasses (d) and (b), having a different temperature crossover point $T_o$, the temperature range for fusion extends approximately between the arrowheads of line F'. To eliminate distortion of the fusion interface the viscosity of the mass of the segment should not fall below $10^8$ poises.

Cleanliness is observed during the operation to reduce interfacial defects resulting from particulate matter and additionally, segment portion 12 is preheated in mold 20 to oxidize unavoidable foreign matter and dehydrate its surfaces.

The glasses of segment portion 12 and major portion 10 are carefully selected for compatibility in assimilating gases at their interface and minimum fusing temperature is used to lessen the release of gases from one or another of these faces.

Distortion of the interface between major portion and segment portions of a cast lens blank, being one of the most serious defects in multifocal lens blank manufacture and heretofore unavoidable in casting procedures, is overcome according to this invention by prudent selection of glasses for the segment and major portions. The selected glasses are characterized as follows:

1. The lower refractive index glass of major portion 10 has a refractive index within the range of from 1.50 to 1.55 and an Abbe number ($\nu_D$) of from 50 to 60 (i.e. dispersive power from 1/60 to 1/50).

2. The higher index glass of segment portion 12 has a refractive index within the range of from 1.59 to 1.70 and an Abbe number ($\nu_D$) from 30 to 60 (i.e. dispersive power of from 1/30 to 1/60).

3. If $\eta_m$ (T) is the viscosity of the major glass as a function of temperature T and if $\eta_s$ (T) is the equivalent function for the segment glass then it is required that $$10^5 \lesseqgtr \eta_m(T_o) = \eta_s(T_o) \lesseqgtr 10^9$$

poises for a temperature $T_o$ and that $$\eta_m(T) < \eta_s(T) \text{ for } T < T_o$$

and $$\eta_m(T) \gtreqless \eta_s(T) \text{ for } T > T_o$$

Figure 7:
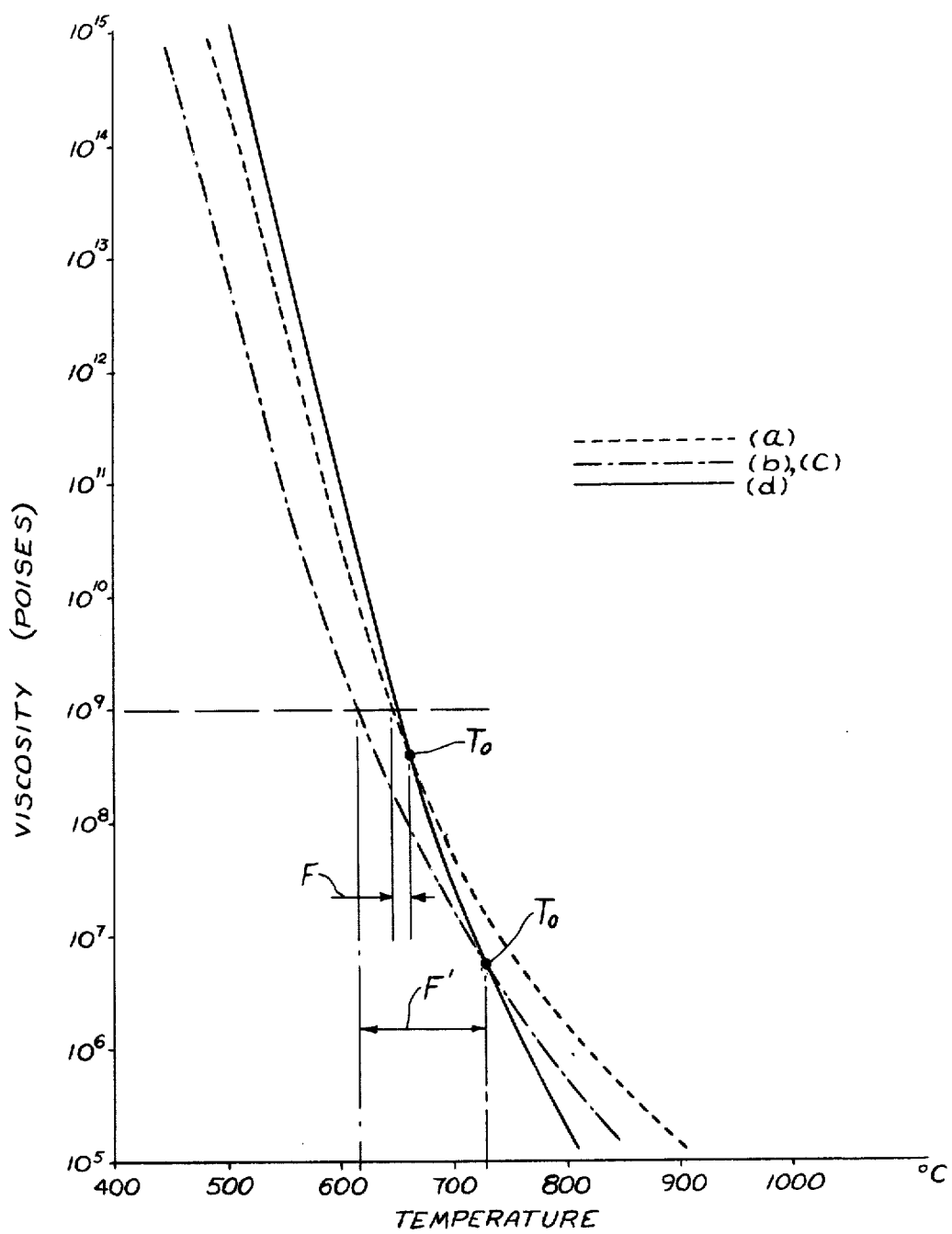
FIG. 7 is a graphical representation of the viscosity vs. temperature function of three low index glasses (curves (a), (b) and (c)) and one high index glass (curve (d)) suitable for the process according to the invention. Curves (b) and (c) coincide within the range of variance determined by the accuracy of the measurements.
Figure 8:
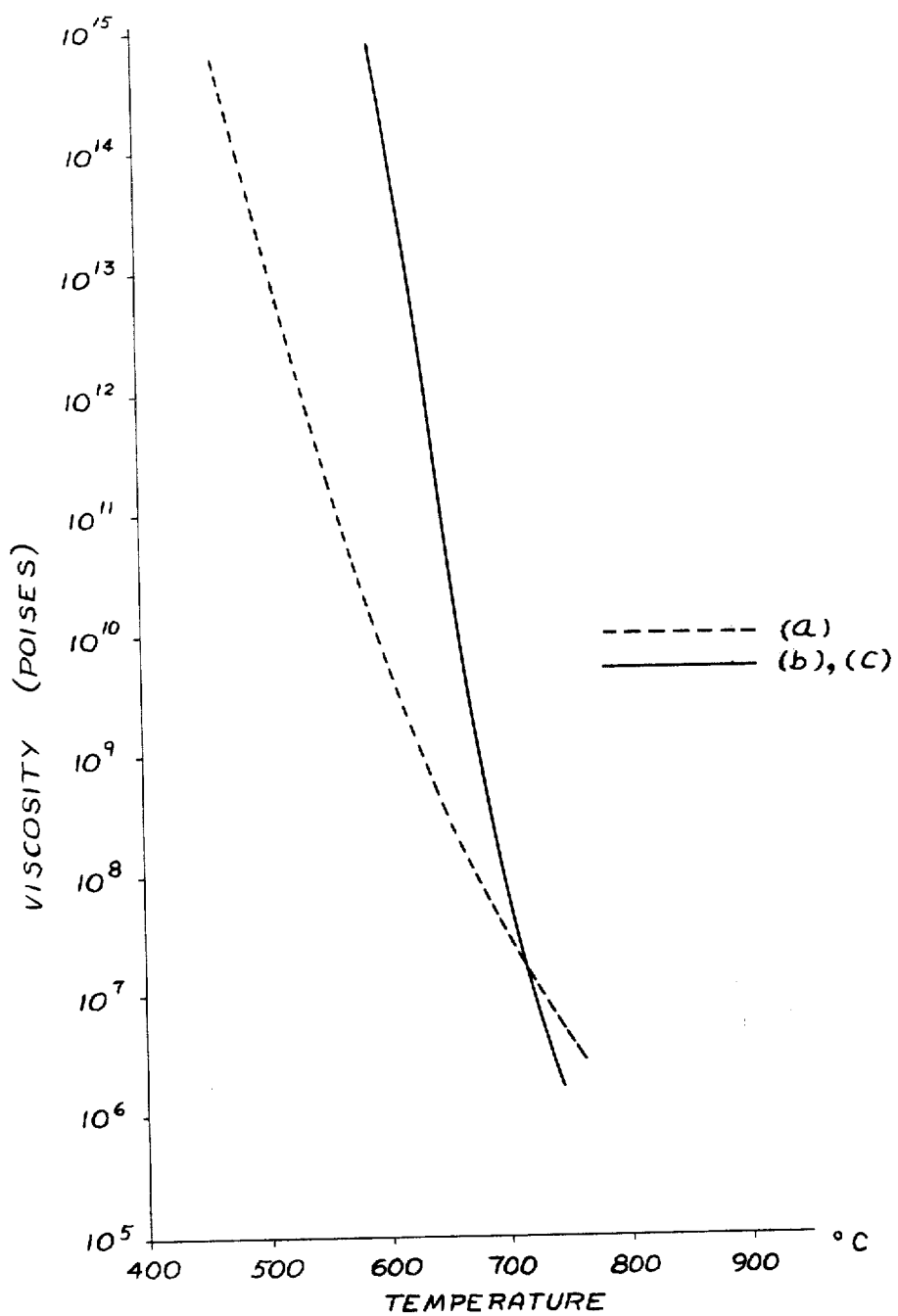
FIG. 8 is a graphical representation of the viscosity vs. temperature function of one low index glass (curve (a)) and two high index glasses (curves (b) and (c)) suitable for the process according to the invention. Curves (b) and (c) coincide.
Figure 9:
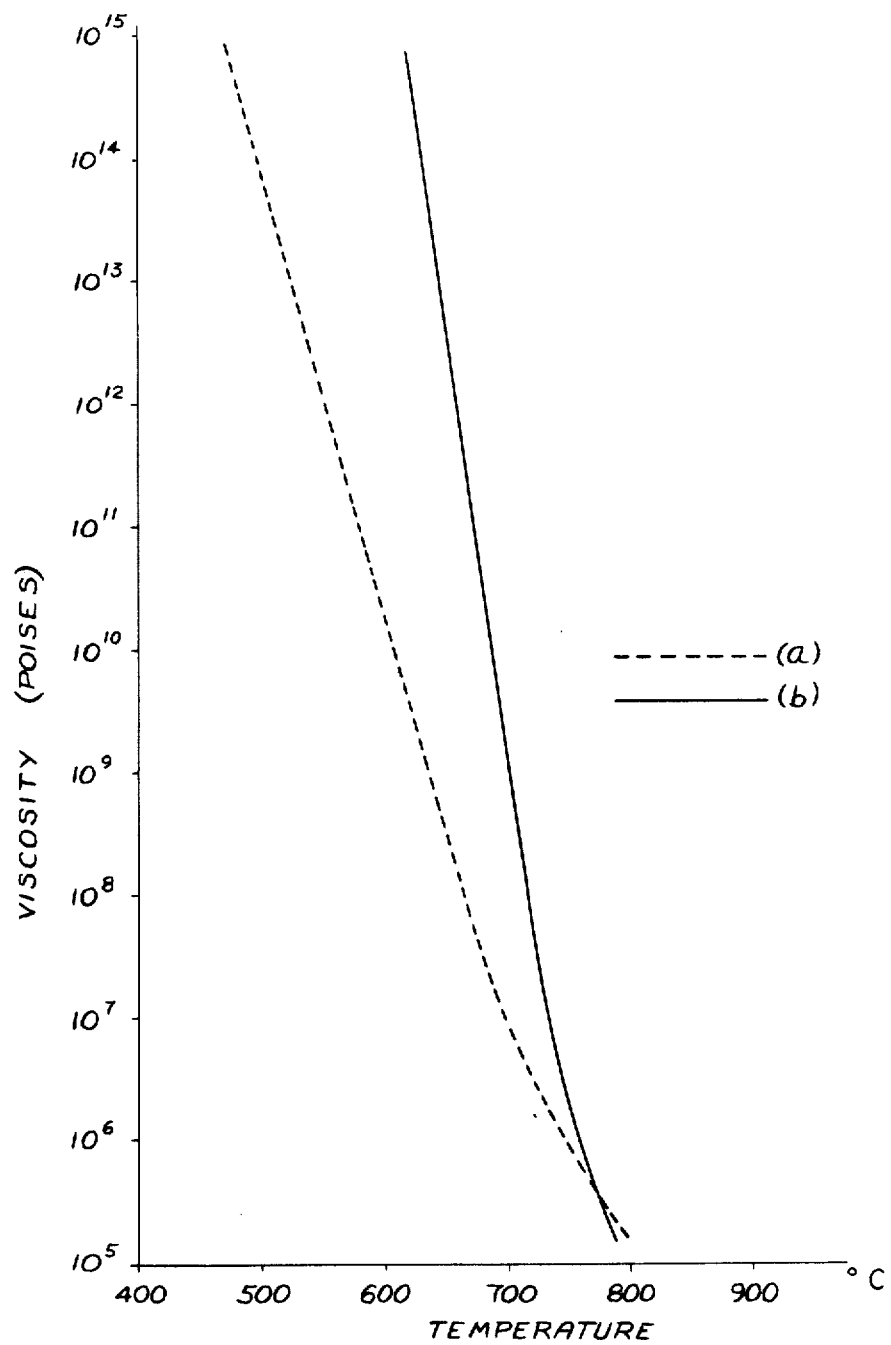
FIG. 9 is a graphical representation of the viscosity vs. temperature function of a low index glass (a) and a high index glass (b) suitable for the process according to the invention.

FIGS. 7 to 9 show examples of viscosity curves of glass combinations meeting these requirements.

4. The viscosity of the lower refractive index glass is approximately ¾ or less (preferably ¼) of the viscosity of the higher refractive index glass at the fusion temperature.

5. The coefficients of linear thermal expansion and the elastic constants of the two glasses are such that the fusion strain in the high index glass would not exceed 25 nm/cm tension and 75 nm/cm compression.

Having met the foregoing criteria in the selection of glasses for segment portion 12 and major portion 10, the major portion 10 is poured and cast over and around segment portion 12 in mold 20. Large amounts of heat from major portion 10 are immediately dispersed by conduction into adjacent portions of the mold and partially into segment portion 12, to increase the segment's surface temperature to allow formation of a permanent fusion, but not sufficiently to cause distortion of the high softening temperature segment. Thus, an interfacial joining of segment portion 12 and major portion 10 results without distorting the surface of the segment. The curvature of the fused interface corresponds to the initially ground and polished curvature of the adjoining surface of segment portion 12.

Interfacial foreign matter defects are avoided by the observance of cleanliness in the casting operation and by preheating of mold halves 22, 24 and segment portion 12 in air. This preheating oxidizes unavoidable particulate foreign matter and removes adsorbed or absorbed water from the glass surfaces. It also obviates thermal shock at the commencement of casting and prevents solidification of the major portion before a strong bond between segment and major portion is formed.

Examples of glass compositions with proportions of ingredients given in weight percent for segment and major portion glasses are as follows:

For major portion 10:

| | |
|---|---|
| $SiO_2$ | 70.00 |
| $TiO_2$ | 1.09 |
| $Sb_2O_3$ | 0.60 |
| $CaO$ | 6.84 |
| $ZnO$ | 4.77 |
| $Na_2O$ | 9.20 |
| $K_2O$ | 7.80 |
| Refractive Index = 1.524 | |
| Viscosity vs. Temperature: see FIG. 7, curve (a) | |

For segment portion 12:

| | |
|---|---|
| $SiO_2$ | 38.04 |
| $ZrO_2$ | 6.00 |
| $TiO_2$ | 4.28 |
| $B_2O_3$ | 2.00 |
| BaO | 18.80 |
| CaO | 6.00 |
| PbO | 16.43 |
| $Na_2O$ | 6.65 |
| $K_2O$ | 1.50 |
| $Sb_2O_3$ | 0.30 |

Refractive Index = 1.660
Viscosity vs. Temperature: see FIG. 7 (d)

The casting operation illustrated in FIGS. 1 and 2 is performed by placing segment portion 12 in mold half 22, preheating mold 20 with segment portion 12 therein to a temperature of approximately 590°C and reducing this temperature of mold 20 and segment 12 to approximately 480°C before the casting operation. This temperature of approximately 480°C is maintained up to the time of casting major portion 10. The glass of major portion 10 is poured for casting at a temperature within the range of from 1150°C to 1360°C (preferably about 1290°C). Casting is then followed by annealing at gradually reduced temperatures for a period of time of approximately two hours to approximately 371°C followed by free cooling to room temperature.

Other relatively low melting temperature, low refractive index glasses which may be used in combination with the foregoing relatively high melting temperature, high refractive index segment glass are:

(1)
| | |
|---|---|
| $SiO_2$ | 68.07 |
| $TiO_2$ | 0.78 |
| $B_2O_3$ | 1.50 |
| $Al_2O_3$ | 2.00 |
| $Sb_2O_3$ | 0.45 |
| CaO | 7.20 |
| ZnO | 2.90 |
| $Na_2O$ | 11.10 |
| $K_2O$ | 6.00 |

Refractive Index = 1.5231
Viscosity vs. Temperature: see FIG. 7 (a)

(2)
| | |
|---|---|
| $SiO_2$ | 68.76 |
| $B_2O_3$ | 1.51 |
| $Al_2O_3$ | 2.02 |
| $Sb_2O_3$ | 1.43 |
| CaO | 7.27 |
| $Na_2O$ | 11.21 |
| $K_2O$ | 4.90 |
| $F_2$ | 2.90 |

Refractive Index = 1.5044
Viscosity vs. Temperature: see FIG. 7 (b)

(3)
| | |
|---|---|
| $SiO_2$ | 68.76 |
| $B_2O_3$ | 1.51 |
| $Al_2O_3$ | 2.02 |
| $Sb_2O_3$ | 1.43 |
| CaO | 7.27 |
| $Na_2O$ | 11.21 |
| $K_2O$ | 5.71 |
| $F_2$ | 2.09 |

Refractive Index = 1.5099
Viscosity vs. Temperature: see FIG. 7 (c)

Additional combinations of relatively low refractive index major portion glass and relatively high refractive index segment portion glasses are:

| | |
|---|---|
| $SiO_2$ | 61.00 |
| $B_2O_3$ | 21.00 |

-Continued
| | |
|---|---|
| $As_2O_3$ | 0.50 |
| PbO | 4.00 |
| ZnO | 4.00 |
| $Na_2O$ | 1.00 |
| $K_2O$ | 8.50 |

Refractive Index = 1.5011
Viscosity vs. Temperature: see FIG. 8 (a)

and the relatively high refractive index high melting temperature segment portion glass being:

| | |
|---|---|
| $SiO_2$ | 5.00 |
| $ZrO_2$ | 8.50 |
| $B_2O_3$ | 35.00 |
| $La_2O_3$ | 34.50 |
| $As_2O_3$ | 0.50 |
| CaO | 7.50 |
| PbO | 3.50 |
| ZnO | 5.50 |

Refractive Index = 1.7223
Viscosity vs. Temperature: see FIG. 8 (b)

or

| | |
|---|---|
| $SiO_2$ | 5.00 |
| $ZrO_2$ | 7.50 |
| $TiO_2$ | 2.00 |
| $B_2O_3$ | 35.00 |
| $La_2O_3$ | 34.50 |
| $As_2O_3$ | 0.50 |
| CaO | 8.00 |
| PbO | 3.50 |
| ZnO | 4.00 |

Refractive Index = 1.7204
Viscosity vs. Temperature: see FIG. 8 (c)

Still another exemplary combination of relatively low refractive index major portion glass and high refractive index segment portion glass is:

For the low refractive index major portion 10:

| | |
|---|---|
| $SiO_2$ | 58.00 |
| $B_2O_3$ | 22.00 |
| $As_2O_3$ | 0.50 |
| PbO | 3.00 |
| ZnO | 4.00 |
| $Na_2O$ | 4.00 |
| $K_2O$ | 8.50 |

Refractive Index = 1.5113
Viscosity vs. Temperature: see FIG. 9 (a)

For the relatively high refractive index segment portion 12:

| | |
|---|---|
| $SiO_2$ | 5.00 |
| $ZrO_2$ | 8.50 |
| $TiO_2$ | 1.00 |
| $B_2O_3$ | 35.00 |
| $La_2O_3$ | 34.50 |
| $As_2O_3$ | 0.50 |
| BaO | 7.00 |
| CaO | 8.50 |

Refractive Index = 1.7160
Viscosity vs. Temperature: see FIG. 9 (b)

Figure 4:
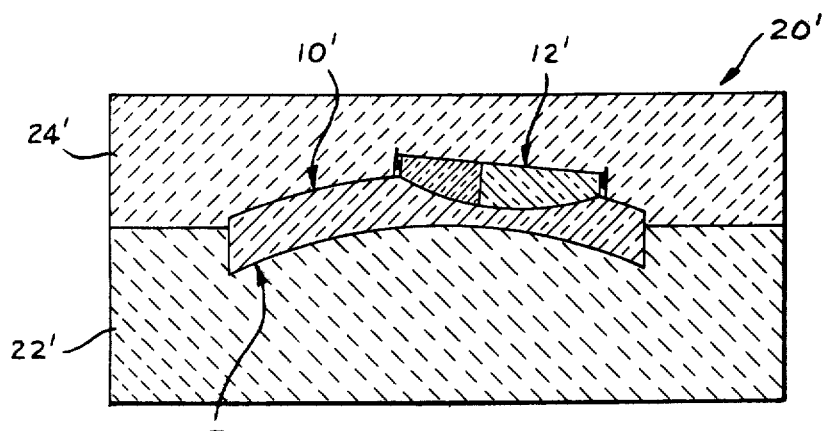

With the foregoing glasses or their equivalents, and exemplary preheating, pouring and fusing temperatures, the multifocal lens casting process may, alternatively, be performed as shown in FIGS. 3 and 4.

According to this latter aspect of the invention, upper mold half 24' is provided with a recess 26 which receives segment portion 12'. A spring 28 frictionally releasably holds segment portion 12' temporarily in recess 26. Said spring to be made of a suitable alloy, such as known in the trade under the designations S816, Rene 41, NS-25, Inconel-X, NS-A 286.

Mold halves 24' and 22' of mold 20' are preheated with segment portion 12' in place and the major portion glass 10' is poured directly into lower mold half 22' as shown in FIG. 3. Soon thereafter, upper mold half 24' with segment portion 12' carried thereby is lowered over and brought tightly against lower mold half 22 as shown in FIG. 4. This impresses segment portion 12' into major portion 10' and, at the same time, casts the major portion 10' to shape with segment portion 12' fused thereto. When annealing and cooling of the mold and cast lens blank B is completed, mold half 24' is lifted and segment portion 12' is released from recess 26.

We claim:

1. A multifocal lens blank comprised of the fused combination of a major portion of low refractive index optical glass and a segment portion of a relatively high refractive index optical glass wherein the improvement comprises;

said segment portion glass having a refractive index within the range of from 1.54 to 1.70 and viscosity $\eta_s(T)$ as a function of a temperature T;

said major portion glass having a refractive index within the range of from 1.50 to 1.55 and viscosity $\eta_m(T)$ as a function of a temperature T with $10^5 \leq \eta_m(T_o) = \eta_s(T_o) \leq 10^9$ poises for a cross-over temperature $T_o$ and $\eta_m(T) < \eta_s(T)$ for $T < T_o$ and $\eta_m(T) \geq \eta_s(T)$ for $T > T_o$; and fusion strain in said segment glass of said fused combination being less than 25 nm/cm tension and 75 nm/cm compression.

2. A fused multifocal lens blank according to claim 1 wherein said segment portion is impressed into said major portion of glass.

3. A fused multifocal lens blank according to claim 1 wherein said glass of said major portion is characterized by a viscosity of less than 1/3 of the viscosity of said glass of said segment portion when both are heated to a temperature suitable for casting and fusion.

4. A fused multifocal lens blank according to claim 1 wherein said glass of said major portion is characterized by a viscosity of approximately of 1/4 of the viscosity of said glass of said segment portion when both are heated to a temperature suitable for casting and fusion.

* * * * *